March 18, 1969 R. A. WILLIAMS 3,434,123

SENSE AMPLIFIER FOR MAGNETIC MEMORY

Filed Oct. 6, 1964 Sheet 1 of 2

INVENTOR.
ROBERT A. WILLIAMS
BY
Carl V. Olson
Attorney

SENSE AMPLIFIER FOR MAGNETIC MEMORY

INVENTOR.
ROBERT A. WILLIAMS
BY
Carl V. Olson
Attorney 3,434,123

SENSE AMPLIFIER FOR MAGNETIC MEMORY

Robert A. Williams, Marlboro, Mass., assignor to Radio Corporation of America, a corporation of Delaware Filed Oct. 6, 1964, Ser. No. 401,816
U.S. Cl. 340—174 9 Claims
Int. Cl. G11b 5/00

ABSTRACT OF THE DISCLOSURE

A memory sense amplifier with strobe switch in series with signal input path. The terminals of a memory sense winding are connected at the input terminals of a differential sense amplifier to a first terminating impedance having a value much higher than the characteristic impedance of the sense winding. The input terminals are also coupled through a series transistor switch to a second terminating impedance having a value equal to the characteristic impedance of the sense winding. The transistor switch is rendered conductive to pass signals to be amplified solely during read time. At other times, the first high impedance causes noise disturbances in the memory to decay rapidly.

This invention relates to magnetic memory systems, and particularly to sense amplifiers for distinguishing information signals from noise disturbances on memory sense windings.

The speed at which a memory can be operated is limited by noise disturbances in the memory. For example, the writing of information into a memory results in disturbances induced on the sense winding which must be allowed to die down before information can be read out from the memory. The noise disturbances associated with the writing of information may have an initial amplitude on the sense winding of as much as one hundred times the amplitude of the desired information signals. The noise disturbances are of such a high amplitude that they also tend to saturate and block the sense amplifier, so that a waiting period is required before the amplifier is again in condition to sense an information signal.

It is a general object of this invention to provide an improved magnetic memory sense amplifier system permitting a shorter read-write operation cycle by speeding the decay of noise disturbances on the sense winding following the write portion of the cycle, and by isolating the sense amplifier from noise disturbances at all times except during the read portion of the cycle.

According to an example of the invention, there is provided a differential sense amplifier having input terminals for connection to the sense winding of a magnetic memory which also has windings receptive to read, write and digit pulses. A first impedance means having a value much higher than the difference-mode characteristic impedance of the sense line is connected across the input terminals. The emitter and collector electrodes of two normally non-conducting transistors are connected to provide current paths from the input terminals to respective terminals of a second impedance means having an impedance substantially equal to the difference-mode characteristic impedance of the sense winding. A switch pulse generator is coupled to the base electrodes of the transistors to render the transistors fully conductive during the times that read pulses are applied to the memory. An amplifier means is coupled to terminals of the second impedance means to amplify sense signals passed by the transistors.

Figure 1:
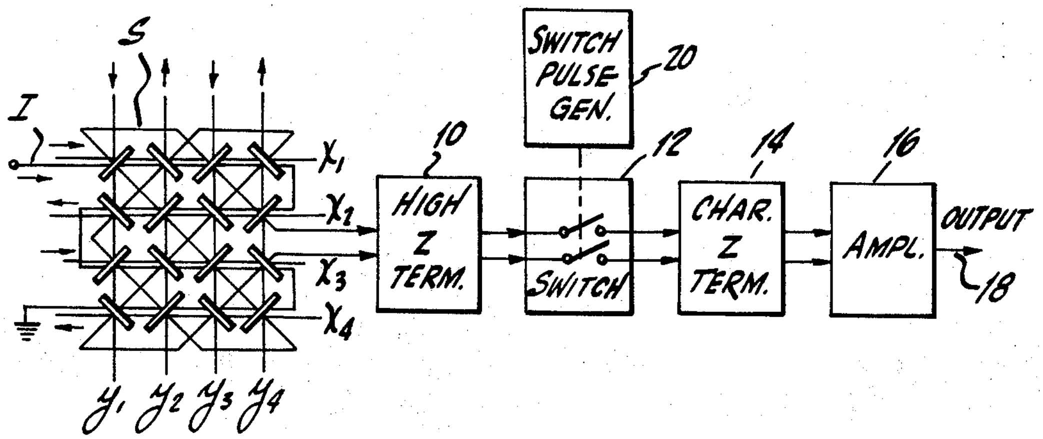
FIG. 1 is a diagram showing one plane of magnetic core memory elements having a sense winding connected to a sense amplifier system shown in block diagram form.

Referring now in greater detail to FIG. 1, there is shown one plane of a coincident-current magnetic core memory illustrated by an array of four magnetic cores per row and four magnetic cores per column. The magnetic cores in each row are linked by the respective conductors $x_1$ through $x_4$. The magnetic cores in each column are linked by respective conductors $y_1$ through $y_4$. The $x$ and $y$ conductors are usually extended to similarly link the magnetic cores of additional memory planes (not shown) of a complete memory stack. An inhibit winding I links all of the magnetic cores in the plane.

A sense winding S also links all of the magnetic cores of the plane. The sense winding S has a configuration designed to provide a cancellation in the sense winding of certain undesired noise disturbances induced on the sense winding. The other memory planes (not shown) of a complete memory stack are each similarly provided with one inhibit winding I and one sense winding S. Each sense winding associated with a respective memory plane is coupled to a respective sense amplifier like the one illustrated in block form in FIG. 1.

The one memory plane illustrated in FIG. 1 is a plane of a memory stack organized in the coincident-current or $x$-$y$ select manner. Each such plane is usually referred to as a digit plane. The inhibit winding I associated with the digit plane is sometimes referred to as a digit winding. The invention, to be described, is also useful with a memory stack of the word-organized or linear-select type. In a linear-select memory, the winding performing a function analagous to the inhibit winding I is called a digit winding. The digit winding and the sense winding in a word-organized memory may be constituted by a single electrical conductor. The supplying of inhibit or digit pulses to a memory during the write portion of the cycle of operation results in the undesired appearance on the sense conductor of noise disturbances which limit the speed at which the memory can be operated in the performance of its read-write cycle.

Both ends of the sense winding S are connected to a high impedance termination 10, through a series transistor switch 12 and then to a characteristic impedance termination 14 and the input of an amplifier 16 having a signal output lead 18. The transistor switch 12 includes transistors which are normally nonconducting to present an open circuit to the signal paths. The transistors in the switch 12 are rendered fully conductive to close the circuit paths when a pulse is supplied to the switch from a switch pulse generator 20. The switch pulse generator 20 closes the switch 12 during the time that read pulses are supplied to one of the memory windings $x_1$ through $x_4$ and, simultaneously, to one of the memory windings $y_1$ through $y_4$.

Figure 2:
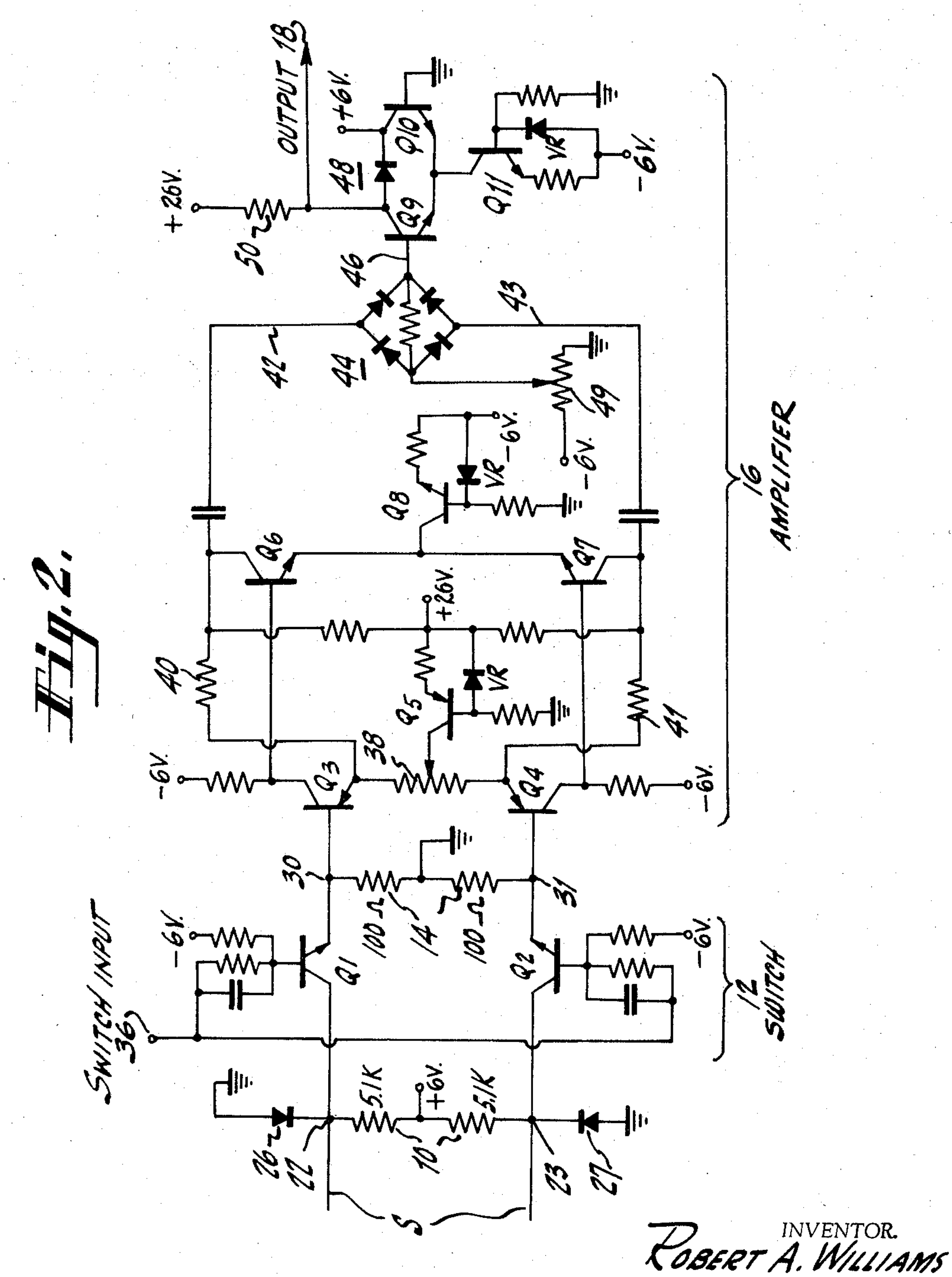
FIG. 2 is a circuit diagram of a differential sense amplifier which may be incorporated in blocks shown in FIG. 1.

Reference is now made to FIG. 2 for a description in greater detail of the circuits in boxes 10, 12, 14 and 16 of FIG. 1. The terminals 22, 23 of the sense winding S are connected to the terminals of an impedance 10 having a centertap connected to a point of reference potential. The impedance 10 has a value much greater than the characteristic impedance of the sense winding S. A sense winding S may have a characteristic impedance for difference mode signals of somewhere in the range of from about 100 to 200 ohms. The impedance 10 should have a value much greater than the characteristic impedance of the sense winding. By this is meant a value at least five times, and preferably at least ten times as great as the characteristic impedance of the sense winding. The impedance 10 may have a value about fifty times greater than the characteristic impedance of the sense winding. The upper limit on the value selected for the impedance 10 is determined by considerations of the effect of higher resistance values on the speed with which transistors $Q_1$ and $Q_2$ can be made to switch between non-conducting and conducting states.

Two diodes 26 and 27 are connected from respective terminals 22, 23 of the sense winding S to ground in a polarity to prevent the application of large negative-going signals to the collectors of transistors $Q_1$ and $Q_2$. Such negative-going signals could undesirably cause a reverse current conduction through normally non-conducting transistors $Q_1$ and $Q_2$.

Transistors $Q_1$ and $Q_2$ have their collector-emitter current-conduction electrodes connected between respective sense winding terminals 22, 23 and respective terminals 30, 31 of an impedance 14 having a centertap connected to a point of reference potential. Impedance 14 has a value substantially equal to the difference-mode characteristic impedance of the sense winding S.

The base or control electrodes of transistors $Q_1$ and $Q_2$ are connected to receive an enabling pulse at the switch input terminal 36 from the switch pulse generator 20 of FIG. 1.

The terminals 30 and 31 of the impedance 14 are connected to the base electrodes of respective transistors $Q_3$ and $Q_4$ of a two-stage differential amplifier also including transistors $Q_6$ and $Q_7$. The direct current balance of the differential amplifier is determined by the circuit of transistor $Q_5$, including the potentiometer 38. Transistor $Q_8$ serves to insure a constant current from the emitters of transistors $Q_6$ and $Q_7$. Resistors 40 and 41 provide degenerative stabilizing feedback from transistors $Q_6$, $Q_7$ to transistors $Q_3$, $Q_4$. The values of resistors 40 and 41 in relation to the value of resistor 38 determine the overall signal gain of the differential amplifier.

A full wave rectifier 44 receptive to the output of the differential amplifier has an output 46 which responds to either positive-going or negative-going signals from the differential amplifier. The output of the full wave rectifier 44 is applied to a threshold detector circuit 48 including two transistors $Q_9$ and $Q_{10}$ connected as a differential amplifier with one input (the base of transistor $Q_{10}$) grounded. The threshold of the threshold circuit 48 is adjustably set by the potentiometer 49. Transistor $Q_9$ is normally biased off by a voltage on its base from potentiometer 49. Transistor $Q_{11}$ draws a constant current, all of which normally flows through transistor $Q_{10}$. The output 18 from non-conducting transistor $Q_9$ is normally clamped at +6 volts. A positive sense signal of sufficient amplitude on either lead 42 or lead 43 overcomes the bias on the base of transistor $Q_9$ and causes it to conduct. Resistor 50 has a value to provide zero volts on output 18 when transistor $Q_9$ draws half of the current permitted by transistor $Q_{11}$. The output 18 may be applied through a strobed gate to a utilization circuit, or may, in many cases, be supplied directly to a utilization circuit.

Figure 3:
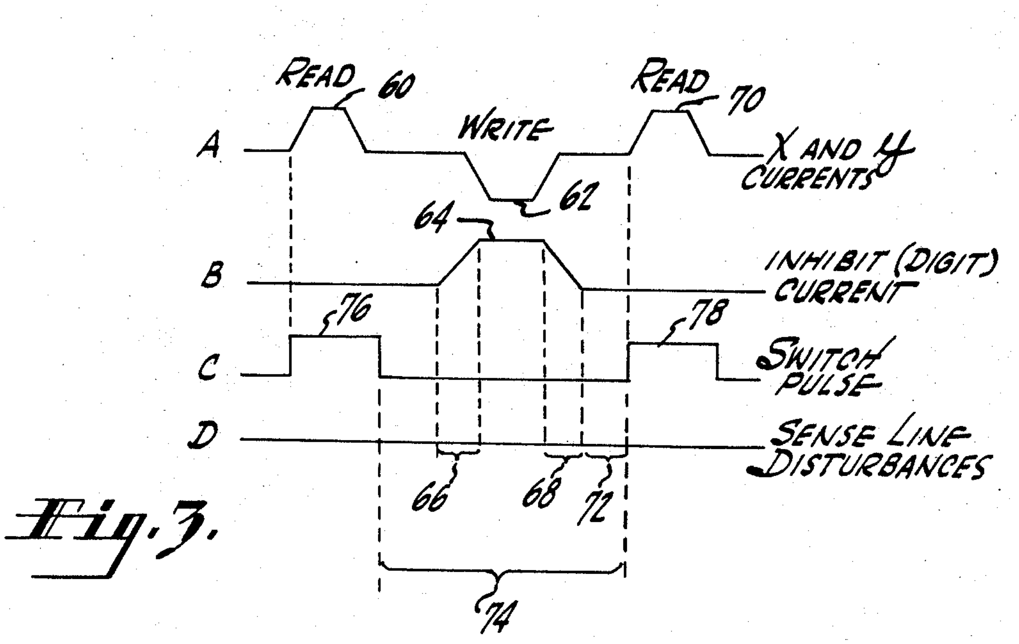
FIG. 3 is a chart of current waveforms which will be referred to in describing the operation of the system of FIGS. 1 and 2.

The operation of the system of FIGS. 1 and 2 will now be described with references also to the waveforms shown in FIG. 3. A memory cycle normally consists of a read portion followed by a write portion. During the write portion, the information previously read out is restored to the same memory location, or new information is written into the memory location. FIG. 3A shows a read pulse 60 followed by a write pulse 62. The read pulse 60 represents the summation of $x$ and $y$ currents applied to one of the conductors $x_1$ through $x_4$, and one of the $y$ conductors $y_1$ through $y_4$, in "read" directions represented by the arrows in FIG. 1. The write pulse 62 represents the summation of $x$ and $y$ currents flowing in the opposite or "write" directions through the same $x$ and $y$ conductors.

The write pulse 62 has an amplitude sufficient to cause a switching of the direction of flux in solely the one selected magnetic core. This switching may arbitrarily be used to indicate the writing of a "1" information bit into the selected memory element. If it is desired to write a "0" into the selected memory element, an inhibit or digit current pulse 64, shown in FIG. 3, is concurrently directed via the inhibit winding I through all of the magnetic cores in the plane. The inhibit or digit current pulse 64 flows in the opposite direction through the selected core compared with the direction of the write current pulse 62. Therefore, the inhibit or digit current pulse prevents the write current pulse from switching the core. The magnetic core then remains in the condition indicative of the storage of a "0" information bit.

The inhibit or digit pulse 64 flows through, and has a disturbing effect on, all of the magnetic cores in the plane. The sense winding S which also links all of the cores in the plane picks up noise disturbances from the cores, and from the inhibit winding I, during the leading edge 66 and the trailing edge 68 of the inhibit or digit current pulse. The noise disturbances induced on or coupled to the sense winding S may have an amplitude as much as 100 times that of information signals to be sensed during the time of the following read pulse 70. A sufficiently large time interval 72 (FIG. 3D) must provided for the noise signals to decay or die down before reading can be attempted. This time period 72 is greatly shortened by the use of the system of the invention.

The switch 12 constituted by transistors $Q_1$ and $Q_2$ presents an open circuit during the time period 74 between successive read pulses 60 and 70. The switch 12 is closed, allowing signals to pass therethrough, only during the times of the pulses 76 and 78 (FIG. 3C) supplied by the switch pulse generator 20.

When the switch 12 presents an open circuit during the time period 74, the sense winding S is connected solely to the very high impedance 10. This high impedance termination causes the disturbances during periods 66 and 68 to die down very rapidly. The reason for the very rapid decay of noise disturbances is to be found in the fact that the sense winding S appears at its terminals to be an inductive element because of the many magnetic cores linked by the winding. The period of time required for a fluctuation in an inductive element to be dissipated is inversely related to the resistance of the current discharge path connected to the inductive element. This may be explained on the basis that current flowing in an inductor tends to continue flowing, and if the continuing current is forced to flow through a large resistor, the energy is more rapidly dissipated than if the path is constituted by a low resistance. The high impedance termination 10 therefore causes the disturbances on the sense winding S to be rapidly attenuated within a relatively short time 72. The next reading operation can take place immediately thereafter.

During the following read portion of the next memory cycle when read pulse 70 is applied to $x$ and $y$ windings, an enabling pulse 78 is simultaneously applied to the transistor switch 12 to cause the transistors $Q_1$ and $Q_2$ to be rendered fully conductive. The transistors then complete the signal path to the characteristic impedance termination 14 and the following amplifier 16. The impedance 14, having substantially the same value as the characteristic impedance of the sense winding S, insures an optimum transfer of the information signal energy induced on the sense winding S to the amplifier 16 without reflection of the information signal back into the sense winding. During the time that switch 12 is closed, the high impedance 10 has a negligible shunting effect on the sense signal.

The transistor switch 12 must be closed to provide signal paths during at least the portions of the durations of read pulses 60 and 70 which are most favorable for distinguishing "1" and "0" sense signals. The switch 12 must be open (not closed) during and immediately following the period of the inhibit or digit pulse 64. Within the foregoing limits, it is advantageous to minimize the periods of time that the switch 12 is closed. It will then in many cases be possible to dispense with the usual strobed gate through which the output 18 of the amplifier would otherwise normally be passed.

What is claimed is:

1. A memory sensing arrangement, comprising:
- a memory sense winding,
- a first terminating impedance connected to said sense winding and having a value much greater than the characteristic impedance of the sense winding,
- a second terminating impedance having a value substantially equal to the characteristic impedance of the sense winding,
- a normally non-conducting transistor switch having a control electrode and having current path electrodes connecting said sense winding to said second terminating impedance,
- means to apply a pulse to said control electrode to render the transistor fully conductive during the read portions of each memory cycle, and
- amplifier means coupled to said second terminating impedance to amplify signals passed by said transistor switch.

2. A memory sensing arrangement as defined in claim 1 wherein said first terminating impedance has a value of about fifty times the characteristic impedance of the sense winding.

3. A sense amplifier having an input terminal connected to the sense winding of a magnetic memory which is also receptive to read, write and digit pulses, comprising:
- first impedance means having a value much greater than the characteristic impedance of said sense line connected from said input terminal to a point of reference potential,
- second impedance means having a value substantially equal to the characteristic impedance of said sense line, and having one end connected to a point of reference potential,
- a normally non-conducting transistor having a control electrode and having current path electrodes connecting said input terminal to the other end of said second impedance means,
- means to apply an enabling pulse to the control electrodes of said transistor to render said transistor fully conductive during the times that read pulses are applied to said memory, and
- amplifier means coupled to said other end of said second impedance means to amplify sense signals passed by said transistor.

4. A sense amplifier having an input terminal for connection to the sense winding of a magnetic memory also having windings to which read, write and digit pulses are applied, comprising:
- first impedance means having a value about fifty times as great as the characteristic impedance of said sense line connected from said input terminal to a point of reference potential,
- second impedance means having a value substantially equal to the characteristic impedance of said sense line, and having one end connected to a point of reference potential,
- a normally non-conducting transistor having a control electrode and having current path electrodes connecting said input terminal to the other end of said second impedance means,
- means to apply an enabling pulse to the control electrodes of said transistor to render said transistor fully conductive during the times that read pulses are applied to said memory, and
- amplifier means coupled to said other end of said second impedance means to amplify sense signals passed by said transistor.

5. A differential sense amplifier having input terminals for connection to the sense winding of a magnetic memory also having windings to which read, write and digit pulses are applied, comprising:
- first impedance means having a value much greater than the characteristic impedance of said sense line and being connected across said input terminals,
- second impedance means having a value substantially equal to the characteristic impedance of said sense line,
- normally-open switch means connected between said input terminals and respective terminals of said second impedance means,
- means to close said switch means during the times that read pulses are applied to said memory, and
- amplifier means coupled to terminals of said second impedance means to amplify sense signals passed by said first and second transistors.

6. A differential sense amplifier having input terminals for connection to the sense winding of a magnetic memory also having windings to which read, write and digit pulses are applied, comprising:
- first impedance means having a value much greater than the characteristic impedance of said sense line and being connected across said input terminals,
- second impedance means having a value substantially equal to the characteristic impedance of said sense line,
- first and second normally non-conducting transistors each having a control electrode and each having current path electrodes connecting said input terminals to respective terminals of said second impedance means,
- means to apply an enabling pulse to the control electrodes of said first and second transistors to render said transistors fully conductive during the times that read pulses are applied to said memory, and
- amplifier means coupled to terminals of said second impedance means to amplify sense signals passed by said first and second transistors.

7. A differential sense amplifier having input terminals for connection to the sense winding of a magnetic memory also having windings to which read, write and digit pulses are applied, comprising:
- first impedance means having a value much greater than the difference mode characteristic impedance of said sense line and being connected across said input terminals,
- second impedance means having a value substantially equal to the difference mode characteristic impedance of said sense line,
- first and second normally non-conducting transistors each having a control electrode and each having current path electrodes connecting said input terminals to respective terminals of said second impedance means,
- means to apply an enabling pulse to the control electrodes of said first and second transistors to render said transistors fully conductive during the time that read pulses are applied to said memory, and
- amplifier means coupled to terminals of said second impedance means to amplify sense signals passed by said first and second transistors.

8. A differential sense amplifier having input terminals for connection to terminals of the sense winding of a magnetic memory also having windings to which read, write and digit pulses are applied, comprising:
- first impedance means having terminal ends connected to said input terminals and having a centertap connected to a point of reference potential, said first impedance means having a value much greater than the difference mode characteristic impedance of said sense line,
- second impedance means having terminal ends and having a centertap connected to a point of reference potential, said second impedance means having a value substantially equal to the difference mode characteristic impedance of said sense line, first and second normally non-conducting transistors each having a control electrode and each having current path electrodes connecting respective input terminals to respective terminal ends of said second impedance means, means to apply an enabling pulse to the control electrodes of said first and second transistors to render said transistors fully conductive during the times that read pulses are applied to said memory, and amplifier means coupled to the terminal ends of said second impedance means to amplify sense signals passed by said first and second transistors.

9. A differential sense amplifier having input terminals for connection to terminals of the sense winding of a magnetic memory also having windings to which read, write and digit pulses are applied, comprising:

first impedance means having terminal ends connected to said input terminals and having a centertap connected to a point of reference potential, said first impedance means having a value about fifty times greater than the difference mode characteristic impedance of said sense line, second impedance means having terminal ends and having a centertap connected to a point of reference potential, said second impedance means having a value substantially equal to the difference mode characteristic impedance of said sense line, first and second normally non-conducting transistors each having a control electrode and each having current path electrodes connecting respective input terminals to respective terminal ends of said second impedance means, means to apply an enabling pulse to the control electrodes of said first and second transistors to render said transistors fully conductive during the times that read pulses are applied to said memory, and amplifier means coupled to the terminal ends of said second impedance means to amplify sense signals passed by said first and second transistors.

References Cited

UNITED STATES PATENTS

| | | | |
|---|---|---|---|
| 3,142,049 | 7/1964 | Crawford ---------- | 340—174 |
| 3,181,132 | 4/1965 | Amemiya ---------- | 340—174 |
| 3,319,233 | 5/1967 | Amemiya et al. ------ | 340—174 |

BERNARD KONICK, *Primary Examiner.*

VINCENT P. CANNEY, *Assistant Examiner.*

U.S. Cl. X.R.

307—88